United States Patent [19]
Lo et al.

[11] Patent Number: 6,053,220
[45] Date of Patent: Apr. 25, 2000

[54] VOLUME-BASED AUTO SEED-DISPENSING APPARATUS

[76] Inventors: Kuang-Sheng Lo, No. 1-1, Lane 25, Min Chih St., Chung Ho, Taipei Hsuen; Li-Tai Peng, 3F, No. 2-3, Alley 4, Lane 190, Sec. 7, Chung Shan N. Rd, Taipei, both of Taiwan

[21] Appl. No.: 09/282,448

[22] Filed: Mar. 31, 1999

[51] Int. Cl.$^7$ .................................................. B65B 43/42
[52] U.S. Cl. ................ 141/129; 141/131; 141/134; 141/175; 141/180; 141/185; 141/237; 141/240; 222/361; 47/901; 47/1.01 R
[58] Field of Search ................... 141/129, 131, 141/134, 180, 183–186, 237–240, 242–244; 222/361; 47/1.01 R, 901

[56] References Cited

U.S. PATENT DOCUMENTS

| | | | |
|---|---|---|---|
| 2,827,928 | 3/1958 | Guckel | 141/134 |
| 3,587,674 | 6/1971 | Adkin | 141/134 |
| 4,141,390 | 2/1979 | Arnold et al. | 47/1.01 R |
| 4,159,727 | 7/1979 | Visser | 141/131 |
| 4,221,175 | 9/1980 | Van Wingerden et al. | 141/239 |
| 4,363,341 | 12/1982 | Powell | 141/183 |
| 4,398,727 | 8/1983 | Walters et al. | 141/238 |
| 4,877,067 | 10/1989 | Shimokawa et al. | 141/129 |
| 4,926,583 | 5/1990 | Hamilton | 47/1.01 R |
| 5,315,810 | 5/1994 | Eaton | 47/901 |
| 5,353,850 | 10/1994 | Ueda et al. | 141/129 |
| 5,651,401 | 7/1997 | Cados | 141/129 |

*Primary Examiner*—J. Casimer Jacyna
*Attorney, Agent, or Firm*—Smith, Gambrell & Russell, LLP

[57] ABSTRACT

An apparatus is provided for automatically and evenly dispensing adequate amount of seeds into bedding compartments of a latticed and bottom-netted seed holder according to a ratio of volume expansion of seeds in the bedding compartment. The apparatus mainly includes a conveyor for forward moving latticed seed holders disposed thereon, a volume-based seed holder straddling the conveyor and having multiple fixed-volume through holes for accommodating seeds to be dispensed into the latticed seed holders, a seed feeding tank mounted on a rail rack over the volume-based seed holder for temporarily storing and dispensing seeds, and sweeping off extra seeds from the volume-based seed holder, and a seed storage for storing seeds to be supplied to the seed feeding tank. With the fixed-volume through holes on the volume-based seed holder, the amount of seeds in each bedding compartment of the latticed seed holder can be well controlled to avoid undesirable compression of seeds after they are soaked and expanded.

1 Claim, 4 Drawing Sheets

VOLUME-BASED AUTO SEED-DISPENSING APPARATUS

FIELD OF THE INVENTION

The present invention relates to a volume-based auto seed-dispensing apparatus, and more particularly to a machine that is designed based on the ratio of volume expansion of seeds to automatically and accurately dispense adequate amount of seeds into each bedding compartment on a latticed and bottom-netted seed holder to culture edible sprouts completely in the same one seed holder without the need of transplanting the sprouted seeds, whereby the seeds in the bedding compartments are prevented from necrosis caused by too many expanded seeds that compress one another in the bedding compartments.

BACKGROUND OF THE INVENTION

It is easy to find in the culture of edible sprouts that roots of the sprouts always turn to land while leaves thereof always turn to light. Therefore, it is a simple way to let the sprouts grow straight upward by periodically and timely watering the seeds. The roots that are coarse and tasting bad can also be easily cut off at a time at the harvest. More particularly, sprouts cultured in a dark room tend to grow freely in all directions. One of the ways to guide the sprouts to grow straight upward is to spread the seeds in a latticed and bottom-netted seed holder disposed in a water container. By this way, the roots of the sprouts would naturally extend downward to the water while the sprouts grow upward. Therefore, the routs of the sprouts cultured and directionally growing in the latticed and bottom-netted seed holders could be easily cut off at a time without any difficulty.

However, it is to be noted that, according to the conventional culturing procedures, all seeds for culturing edible sprouts must be soaked in water until the skin thereof crack. Then, accelerating germination and culturing sprouts are proceeded. Some of the soaked and cracked seeds having early grown sprouts tend to become necrotic when the sprouts are carelessly bent during transplanting of the soaked seeds into the latticed and bottom-netted seed holder. The necrotic seeds would cause rotted sprouts due to the spread of bacteria in the seed holder. To avoid the problem of bent sprouts, the seeds are put into the latticed and bottom-netted seed holder and soaked. To culture the sprouts economically, sufficient quantity of seeds must be put in each bedding compartment of the latticed seed holder. However, if there are too many seeds soaked in each bedding compartment of the latticed seed holder, the seeds tend to compress one another when they become expanded after soaking. Such compression would also causes necrotic seeds.

There is a quantity-based seed-dispensing apparatus currently available in the market to control the quantity of seeds being put in each bedding compartment. However, not all the seeds have the same size. Therefore, the same quantity of seeds in each bedding compartment would not necessarily have the same expanded volume to avoid undesirable compression of them in the bedding compartment.

SUMMARY OF THE INVENTION

It is therefore a primary object of the present invention to provide a volume-based auto seed-dispensing apparatus that is designed based on the ratio of volume expansion of seeds to automatically and accurately dispense adequate amount of seeds into each bedding compartment on a latticed and bottom-netted seed holder.

To achieve the above and other objects, the apparatus of the present invention mainly includes a conveyor for forward moving latticed and bottom-netted seed holders disposed thereon, a volume-based seed holder straddling the conveyor and having multiple through holes for accommodating seeds to be dispensed into one of the latticed seed holders on the conveyor vertically aligned with the volume-based seed holder, a seed feeding tank mounted on a rail rack to move to and fro over the volume-based seed holder for temporarily storing seeds to be dispensed onto the volume-based seed holder, and a seed storage preferably below the volume-based seed holder and the conveyor for storing seeds to be supplied to the seed feeding tank. Extra seeds released from the seed feeding tank onto the volume-based seed holder are automatically swept off to leave only the predetermined adequate mount of seeds in each of the through holes on the volume-based seed holder for dispensing into the latticed seed holder, thereby soaked and expanded seeds in each bedding compartment of the latticed seed holder are prevented from necrosis caused by undue compression of the seeds against one another in the bedding compartment.

BRIEF DESCRIPTION OF THE DRAWINGS

The structural features and the operation of the present invention can be best understood by referring to the following detailed description of the preferred embodiments and the accompanying drawings, wherein.

DETAILED DESCRIPTION OF THE PREFERRED EMBODIMENTS

Figure 1:
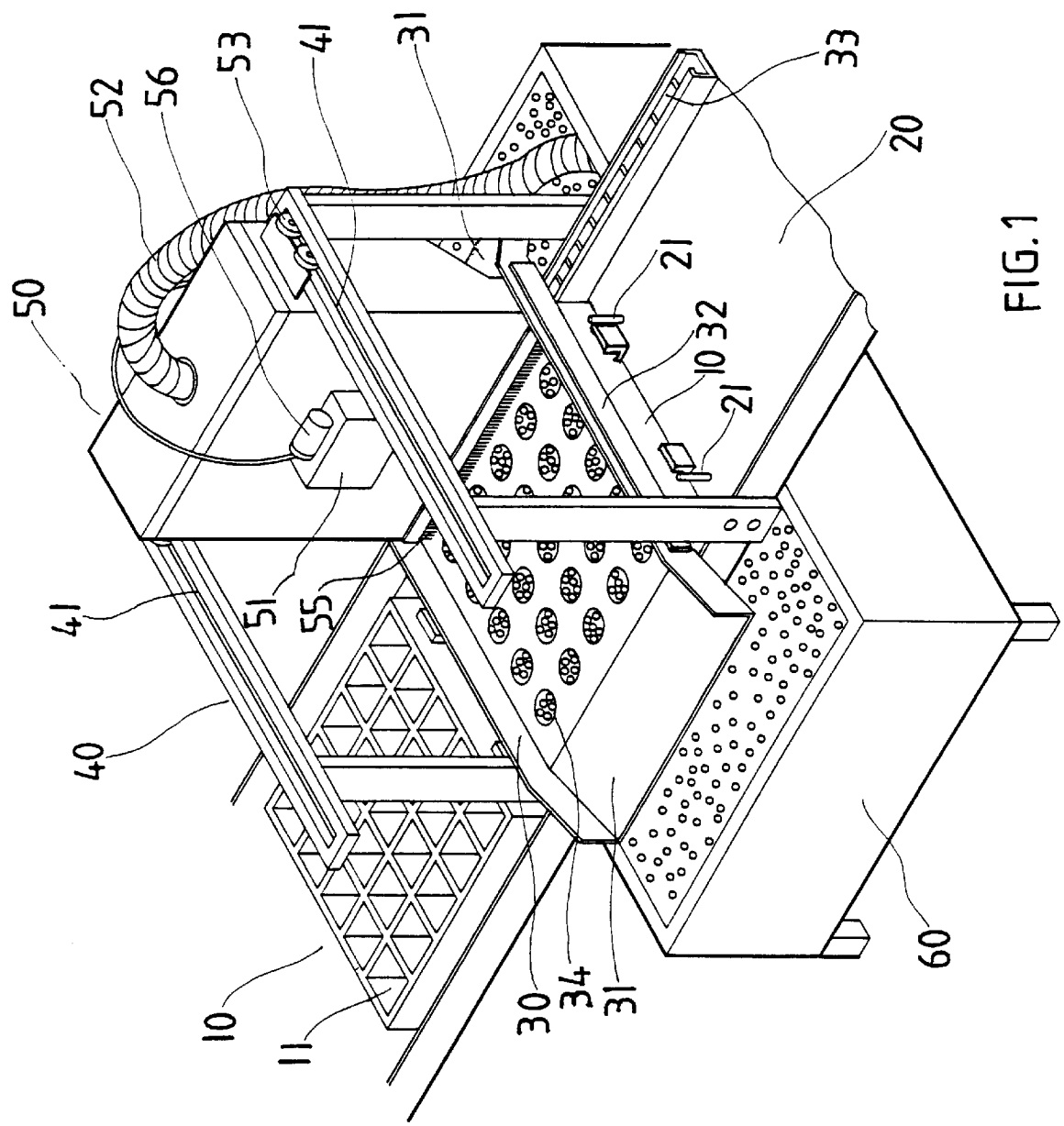
FIG. 1 is a perspective view of a volume-based auto seed-dispensing apparatus according to the present invention.
Figure 2:
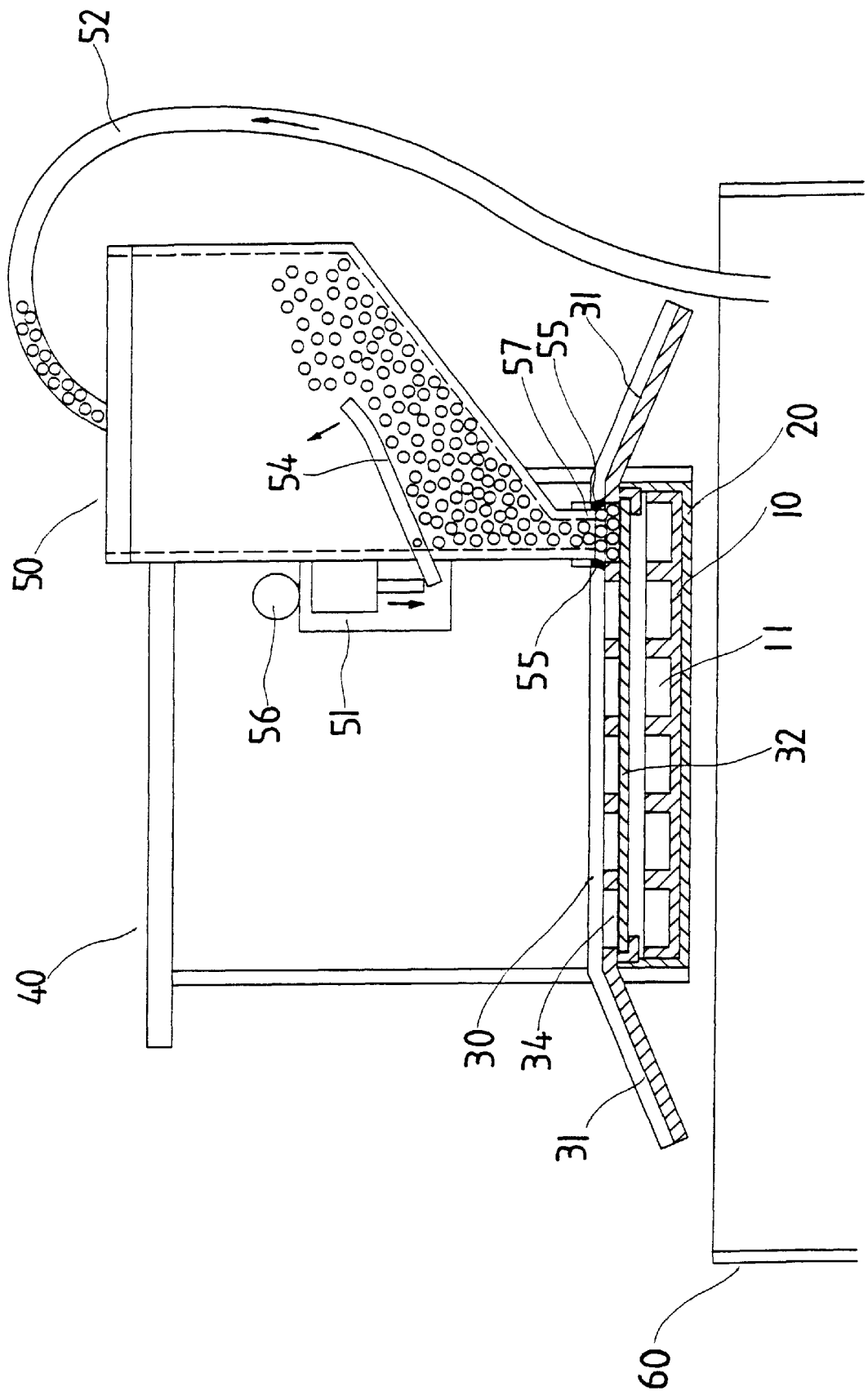
FIG. 2 is a side sectional view of the apparatus of FIG. 1 showing the operation thereof, wherein the baffle board in the apparatus is in a lifted position to allow the seed feeding.

Please refer to FIGS. 1 and 2 that are perspective and side sectional views, respectively, of a volume-based auto seed-dispensing apparatus according to the present invention. The apparatus is an automated machine mainly designed to evenly dispense suitable quantity of seeds for culturing edible sprouts into each bedding compartment 11 of a latticed and bottom-netted seed holder 10 based on a ratio of volume expansion of seeds being soaked in water contained in the bedding compartments 11. Apart from the latticed seed holder 10, the apparatus further includes a conveyor 20, a volume-based seed holder 30, a rail rack 40, a seed feeding tank 50, and a seed storage 60.

The conveyor 20 can forward move the latticed seed holder 10 horizontally positioned on the conveyor 20 at a pre-set speed. At least one retaining spring 21 is provided on the conveyor 20 at a position suitably in front of the volume-based seed holder 30 supported over the conveyor 20 (two spaced retaining springs 21 are illustrated in FIG. 1). The retaining springs 21 can be controlled to timely project from or sink below the conveyor 20, whereby when the retaining springs 21 are upward projected, the latticed seed holder 10 conveyed by the conveyor 20 to a position below the volume-based seed holder 30 is stopped by the retaining springs 21.

The volume-based seed holder 30 straddles the conveyor 20, such that a suitable distance exists between a flat bottom of the volume-based seed holder 30 and a top surface of the conveyor 20. The volume-based seed holder 30 is provided at two sides thereof traversing the conveyor 20 with two upward and vertically extended protective walls and at another two sides extending along the conveyor 20 with two downward and outward extended inclined boards 31. The flat bottom of the volume-based seed holder 30 has a suitable thickness and is formed of a plurality of fixed-volume through holes 34 corresponding to the bedding compartments 11 on the latticed seed holder 10. A partition board 32 is horizontally positioned beneath the flat bottom of the volume-based seed holder 30. The partition board 32 is supported on a pair of guiding rails 33 and can be timely pushed or pulled by actuating means in the rails 33 to either locate below the volume-based seed holder 30 to seal bottoms of the through holes 34 or move away from the volume-based seed holder 30 to open the through holes 34. The actuating means maybe of pneumatic or hydraulic type, or step pulleys, or gears and racks, or any other suitable forms, so long as they may achieve the purpose of moving the partition board 32.

The rail rack 40 is vertically erected right over the volume-based seed holder 30 with its supporting legs fixed to outer edges of the conveyor 20. Two parallelly arranged top members of the rail rack 40 are provided at their upper surfaces with a groove each to serve as a slide way 41.

The seed feeding tank 50 is used to temporarily store seeds to be dispensed into the volume-based seed holder 30. The seed feeding tank 50 is provided near upper portions of its two opposite side walls adjacent to the rail rack 40 with step pulleys 53, so that the step pulleys 53 can be located in the slide ways 41 of the rail rack 40 to bring the seed feeding tank 50 to move along the slide ways 41. The seed feeding tank 50 is also provided at a proper place, such as at a front side facing the volume-based seed holder 30 as shown in FIG. 1, with a seed feeding controller 51. As can be seen from FIG. 2, by operating the seed feeding controller 51, a baffle board 54 horizontally disposed in and pivotally connected to the seed feeding tank 50 is lifted or lowered to allow or stop feeding of seeds into the through holes 34 on the volume-based seed holder 30. A vibrator 56 is mounted on a top of the controller 51 to facilitate smooth and even feeding of seeds. A suction tube 52 is connected at an end to a top of the seed feeding tank 50 and at the other end to the seed storage 60, so that seeds in the seed storage 60 can be sucked into the suction tube 52 and sent into the seed feeding tank 50. The seeds in the seed feeding tank 50 fall into the through holes 34 via a narrowed outlet 57 provided at a bottom of the seed feeding tank 50. To ensure smooth and even dispensing of the seeds into the through holes 34, two rows of brushes 55 are provided along lower front and lower rear edges of the outlet 57 across the volume-based seed holder 30.

The seed storage 60 stores and supply seeds to be dispensed into the volume-based and the latticed seed holders 30 and 10, respectively. To effectively minimize a length of the suction tube 52 that extends between the seed feeding tank 50 and the seed storage 60 to deliver seeds, the seed storage 60 is preferably located below the conveyor 20 and right below the volume-based seed holder 30. However, other suitable positions are also acceptable.

Figure 3:
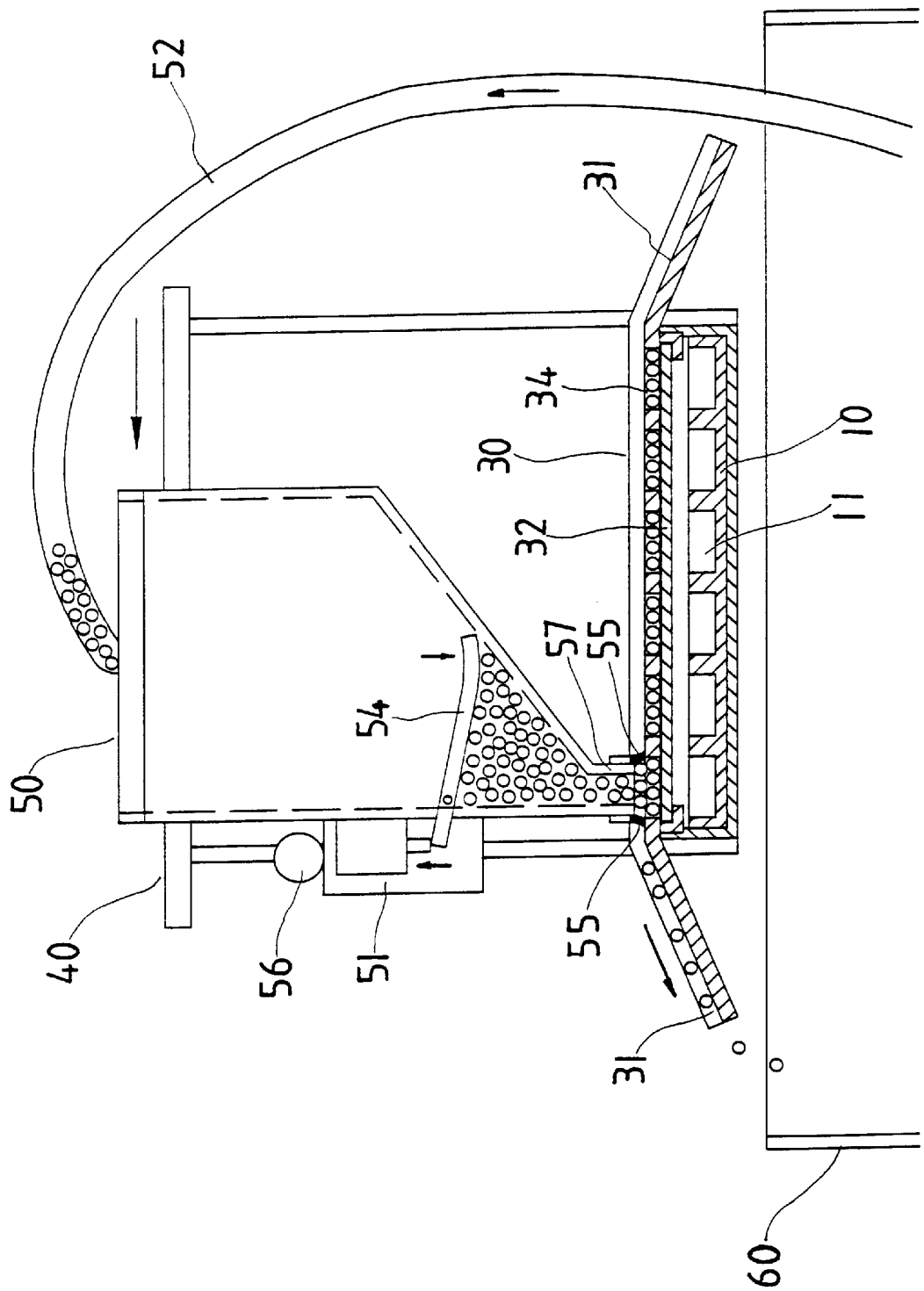
FIG. 3 is another side sectional view of the apparatus of FIG. 1 showing the operation thereof, wherein the baffle board in the apparatus is in a lowered position to allow seed dispensing.
Figure 4:
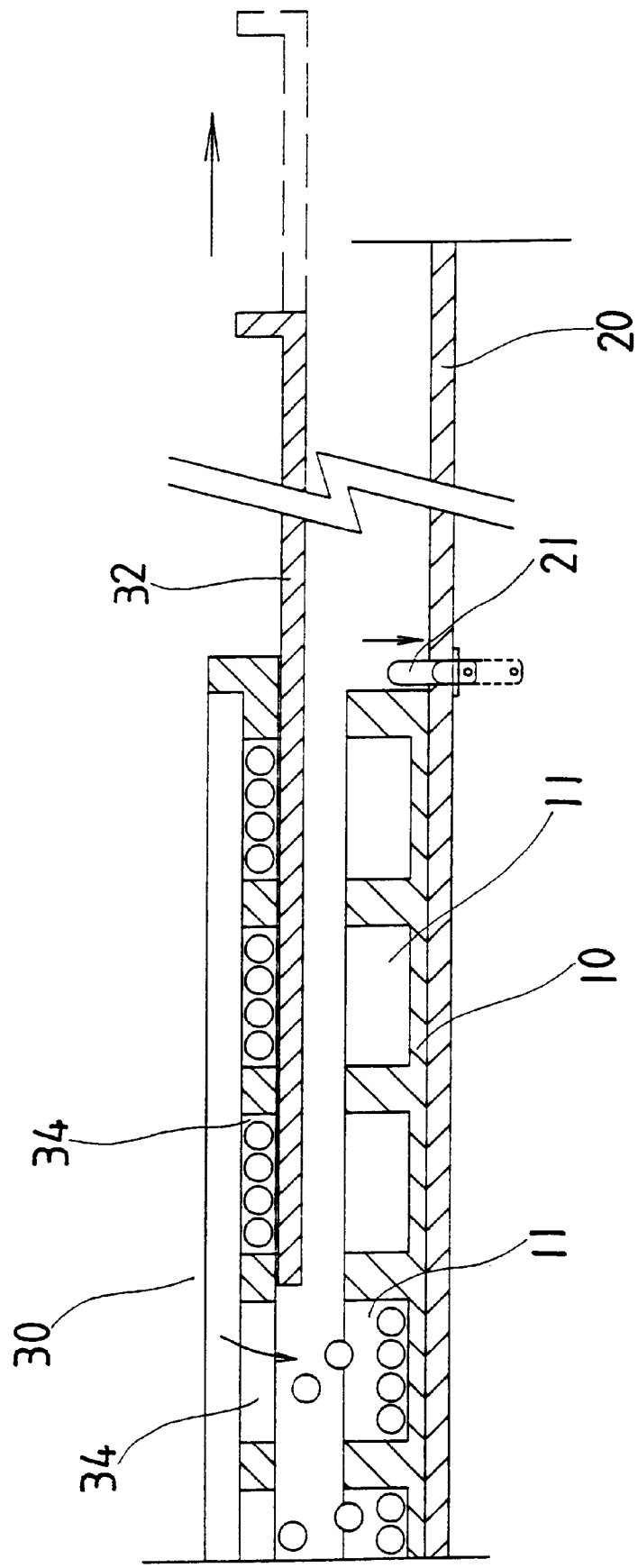
FIG. 4 is a fragmentary and enlarged side sectional view showing the horizontal partition board is pulled outward from the bottom of the volume-based seed holder to let seeds fall into the latticed seed holder.

Please refer to FIGS. 3 and 4. When the apparatus of the present invention operates in an automated manner, multiple latticed seed holders 10 sequentially and horizontally positioned on the conveyor 20 are automatically moved forward until the first one of the latticed seed holders 10 reaches and contacts the retaining springs 21 that project from the conveyor 20. At this point, the first latticed seed holder 10 is located in place on the conveyor 20 and the controller 51 on the seed feeding tank 50 is actuated to lift the baffle board 54 by a linking shaft of the controller 51 to allow seeds in the tank 50 to accumulate above the outlet 57 for dispensing later. When the seeds in the seed feeding tank 50 are dispensed into the fixed-volume through holes 34 on the volume-based seed holder 30, the seed feeding tank 50 is brought by the step pulleys 53 to move forward and backward along the slide ways 41 on the rail rack 40 for several times (generally from two to three times), allowing the two rows of brushes 55 provided at lower edges of the outlet 57 to even the seeds dispensed into the through holes 34. Any extra seeds outside the through holes 34 are swept by the brushes 55 to the inclined boards 31 at two sides of the volume-based seed holder 30 and then fall into the seed storage 60 disposed below the volume-based seed holder 30. Seeds fallen into the seed storage 60 can be reused later.

When the seeds in the seed feeding tank 50 gradually decrease to an extent not sufficient for regular dispensing, the suction tube 52 is actuated to suck seeds from the seed storage 60 and send them into the seed feeding tank 50.

When the dispensing of seeds into the volume-based seed holder 30 is completed and extra seeds are swept off the volume-based seed holder 30, the horizontal partition board 32 originally disposed right beneath the volume-based seed holder 30 is now moved away from the volume-based seed holder 30 by pulling it outward along the guiding rails 33 to a predetermined point, as shown in FIG. 4. When the partition board 32 is being pulled outward, seeds in the through holes 34 sequentially fall into corresponding bedding compartments 11 on the first latticed seed holder 10 stopped by the retaining springs 21 on the conveyor 20. After the partition board 32 has been pulled to the predetermined point, it is automatically pushed back to its original position beneath the volume-based seed holder 30. At this point, all the seeds in the through holes 34 have fallen into the corresponding bedding compartments 11, and the retaining springs 21 are caused to sink below the conveyor 20, allowing the first latticed seed holder 10 loaded with seeds to be pushed forward by other latticed seed holders 10 behind it. When the first latticed seed holder 10 is completely pushed beyond the retaining springs 21, the retaining springs 21 are caused to project from the conveyor 20 again to stop the next latticed seed holder 10 from moving any further and therefore locating right below the volume-based seed holder 30.

The above-described movement cycles to permit fully automated dispensing of seeds into the bedding compartments 11 of the latticed seed holders 10. With the apparatus of the present invention, a lot of labors can be saved to reduce the cost of culturing edible sprouts from the seeds. The present invention is therefore economical for use. In conclusion, the volume-based auto seed-dispensing apparatus of the present invention enables the culture of edible sprouts to be proceeded completely within the same one latticed seed holder 10 without the need of transplanting the sprouted seeds. Moreover, the amount of seeds automatically dispensed into each bedding compartment 11 of the latticed seed holder 10 for culturing edible sprouts is accurately decided depending on the ratio of volume expansion of the seeds soaked in water that is reflected by the fixed-volume through holes on the volume-based seed holder, preventing the seeds from necrosis in the course of culturing caused by too many expanded seeds that compress one another within the bedding compartment. The problem of carelessly bent and rotted sprouts in the course of accelerating germination and transplanting as would usually occur in other conventional culturing methods to cause serious loss could be effectively avoided by adopting the present invention.

What is to be noted is the present invention described above is to be taken as a preferred embodiment of the invention and that various changes in the arrangements may be resorted to without departing from the spirit of the invention or the scope of the subjoined claims.

What is claimed is:

1. A volume-based auto seed-dispensing apparatus for automatically and evenly dispensing adequate amount of seeds into each of multiple bedding compartments on a latticed and bottom-netted seed holder according to a ratio of volume expansion of seeds in said bedding compartment, said apparatus comprising:

a conveyor on and along which a plurality of said latticed seed holders can be horizontally and sequentially disposed and automatically moved forward, said conveyor being provided at a predetermined point with at least one retaining spring that can be controlled to timely project from said conveyor to stop said latticed seed holders from moving any further to locate in place on said conveyor or to sink below said conveyor to allow said latticed seed holders to move forward again;

a volume-based seed holder for controlling said adequate amount of seeds to be dispensed into said bedding compartments on said latticed seed holder, said volume-based seed holder straddling said conveyor with a suitable distance existing between a flat bottom of said volume-based seed holder and a top surface of said conveyor, said flat bottom being formed of a plurality of fixed-volume through holes corresponding to said bedding compartments on said latticed seed holder for each accommodating said adequate amount of seeds therein, a partition board being horizontally disposed beneath said flat bottom to seal bottoms of said through holes, and two outward and downward inclined boards being provided at two sides of said flat bottom extending along said conveyor;

a rail rack vertically erected right above said volume-based seed holder, said rail rack including downward supporting legs separately located at two sides of said volume-based seed holder and two parallel upper members over and across said conveyor, and said upper members having a slide way each provided at a top surface thereof; a seed feeding tank for temporarily storing seeds to be dispensed into said through holes of said volume-based seed holder, said tank being provided at two lateral sides adjacent to said parallel upper members of said rail rack with step pulleys that are rotatably located in said slide ways to bring said seed feeding tank to move forward and backward along said slide ways of said rail rack, a controller and a vibrator being provided on said seed feeding tank at a proper position to lift or lower a baffle board pivotally mounted in said tank in order to accumulate or release seeds for dispensing into said volume-based seed holder, said seed feeding tank having a narrowed bottom portion that serve as an outlet for releasing seeds onto said volume-based seed holder, and said outlet being provided at two longer edges across said volume-base seed holder with two rows of brushes for evening seeds in said fixed-volume through holes and sweeping off extra seeds from said volume-base seed holder; and a seed storage disposed at a predetermined suitable position for storing seeds to be dispensed into said latticed seed holder, said storage being distantly connected to said seed feeding tank by a suction tube that has an end connected to a top of said seed feeding tank and another end to said seed storage, whereby seeds stored in said seed storage can be timely sucked into said suction tube and supplied to said seed feeding tank.

* * * * *